United States Patent [19]

Hedin et al.

[11] 4,351,061
[45] Sep. 21, 1982

[54] METHOD OF PHASE SYNCHRONIZATION IN A SYNCHRONOUS DATA TRANSMISSION SYSTEM, AND APPARATUS FOR CARRYING OUT THE METHOD

[75] Inventors: Jan S. Hedin, Tumba; Göran A. Jarnestedt, Johanneshov, both of Sweden

[73] Assignee: Telefonaktiebolaget L M Ericsson, Stockholm, Sweden

[21] Appl. No.: 195,420

[22] PCT Filed: Oct. 12, 1979

[86] PCT No.: PCT/SE79/00204

§ 371 Date: Jun. 13, 1980

§ 102(e) Date: May 30, 1980

[87] PCT Pub. No.: WO80/00903

PCT Pub. Date: May 1, 1980

[30] Foreign Application Priority Data

Oct. 13, 1978 [SE] Sweden ............................ 7810735

[51] Int. Cl.$^3$ ............................................ H04L 25/49
[52] U.S. Cl. ........................................ 375/20; 375/43; 329/50
[58] Field of Search ................. 375/18, 20, 43, 97, 375/110, 114, 116, 119, 120; 371/55, 56; 340/347 DD; 370/100; 331/1 A; 307/516; 328/109, 133, 140; 329/50, 122, 124

[56] References Cited

U.S. PATENT DOCUMENTS 3,860,871 1/1975 Hinoshita et al. .................. 375/20
4,010,421 3/1977 Lind ................................... 375/20

OTHER PUBLICATIONS

Ein Verfahren zur Datenübertragung auf Primärgruppenverbindungen, NTZ 29, 1976 H.6p. 449–452.
IEEE Transactions on Communications, Feb. 1975, pp. 259–265, (The Effects of Equalization, Timing and Carrier Phase on Eye Patterns of Class-4 Partial-Response Data Signals).

Primary Examiner—Benedict V. Safourek
Attorney, Agent, or Firm—Hane, Roberts, Spiecens & Cohen

[57] ABSTRACT

A method and an apparatus for phase synchronization in a synchronous data transmission system, which transmits a binary pulse train from a transmitter to a receiver by means of an amplitude-modulated carrier. The modulation is of the so-called single-side band type (SSBAM) and the modulating signal which has been derived from the input data flow consists of superimposed pulses of so-called Partial-Response Class 4 type. The receiver clock generator consists of a digital phase-locked loop (TK, FD) controlled by level crossovers in the baseband signal, in which there is arranged between the phase detector (FD) and the oscillator (TK) a sorting circuit (SD), which sorts out and passes through to the oscillator (TK) only such information related to detected level crossovers of a predetermined first category. Further, carrier regeneration is provided by a second phase-locked loop (CR) in series with a phase correction circuit (FK). The phase correction is initiated from the sorting circuit (SD) for level crossovers of a predetermined second category.

8 Claims, 6 Drawing Figures

METHOD OF PHASE SYNCHRONIZATION IN A SYNCHRONOUS DATA TRANSMISSION SYSTEM, AND APPARATUS FOR CARRYING OUT THE METHOD

FIELD OF THE INVENTION

The present invention relates to a method and an apparatus for phase synchronization in a synchronous data transmission system, which transmits a binary pulse train from a transmitter to a receiver by means of an amplitude modulated carrier. Specifically, the modulation is of the type known as single-side band amplitude modulation (SSBAM) and the modulating signal, which is derived from the input data flow consists of superimposed pulses of the Partial Response Class IV type.

DESCRIPTION OF PRIOR ART

The above-mentioned type of modulation is often used for high-speed transmission of data over Band-Limited-channels (CCITT Recommendation V. 36, Doc. APVI number 44 1976, pp 139–147). The instantaneous signal amplitude in the modulating signal according to the above contains contributions from several coded input data bits, and conversely a Partial-Response Pulse thus extends over several periods of the input data signal. The Partial-Response concept is described in detail, inter alia in the U.S. Pat. No. 3,388,330.

In order that the binary data signal can be restored correctly at the receiver side, information about both carrier frequency and carrier phase as well as bit rate and bit phase must be available at the receiver.

Although the recovery of carrier frequency and bit rate at the receiver side does not usually create any problems, an optimum control of carrier phase and bit phase can cause greater difficulties. A phase error of some few degrees can namely result in heavy distortion with accompanying data loss.

The carrier frequency is usually recovered from a transmitted pilot signal via narrow band filtering, but it is often impossible to get usable information about the carrier phase at the transmitter side from the transmitted pilot signal due to phase distortion in the transmitting channel. With regard to the bit rate, this can be obtained via zero crossover detection of the demodulated signal, even for the case where demodulation takes place in an incorrect phase.

A method is previously known for directly deriving a control signal for the bit phase and carrier phase from the symmetry properties of the transmitted demodulated signal. (Ein Verfahren zur Datenübertragung auf Primärgruppenverbindungen NTZ 29, 1976 H.6 s. 449–452). The method requires complicated analogue signal processing and is furthermore dependent on the transmitted binary data signal containing an average of just as many ones as zeroes. There is further required a mean value of the error signal over a large number of data bits, which results in long synchronization times.

A method is also known, which utilizes the equalizer tap settings for generating a control signal for the bit phase and carrier phase, in systems with adaptive equalizers of the transversal type. (IEEE Transactions on Communication, September 1975, pp. 976–979). This method is very suitable for transmission systems where channel equalizing by means of adaptive equalizers is required but becomes complicated and expensive when this is not the case.

SUMMARY OF THE INVENTION

An object of the present invention is to provide phase synchronization in the detection of data signals of the type mentioned above.

The proposed solution utilizes certain sorted-out zero crossovers in the base band signal obtained after demodulation on the receiver side, to create suitable control signals for the phase correction. Further distinguishing features of the invention are apparent from the characterizing parts of the accompanying patent claims.

The advantages with the proposed solution are, inter alia, a very rapid phasing-in sequence and large pull-in range without utilizing any special starting sequence or the like, and the possibility of entirely digital realisation.

BRIEF DESCRIPTION OF THE DRAWINGS

The invention will now be described in detail by an embodiment with reference to the appended drawing on which.

PREFERRED EMBODIMENTS

The embodiment described below relates to synchronous data transmission (64 kb/s) on a 12-group communication in a carrier frequency system. For such transmission, CCITT has recommended the above-mentioned modulation, i.e. SSBAM-PR IV (Single-Side Band Amplitude Modulation-Partial Response, class IV).

Figure 1:
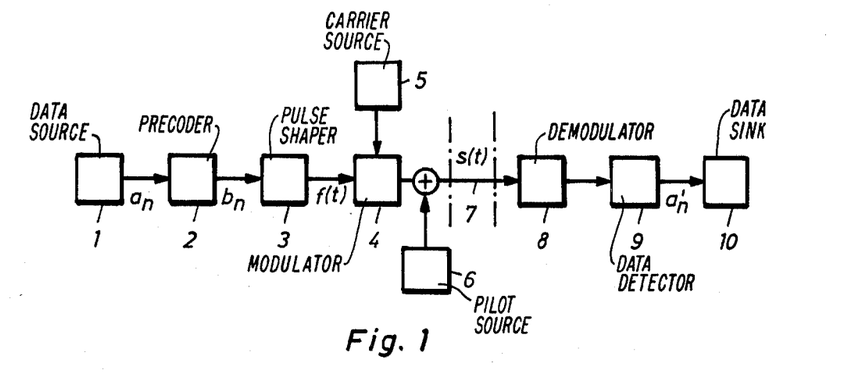
FIG. 1 illustrates a block diagram of a transmission system utilizing the invention.

In greatly simplified form, FIG. 1 is a block diagram of a transmission system for such transmission. A binary pulse train $a_n$ is transmitted from a data source 1, for transmission to the receiver side. A precoder 2 processes this pulse train $a_n$ so that a resulting binary pulse train $b_n$, i.e. the precoder output signal, is given correlative properties. The significance of this is that the value of the signal $b_n$ at every pulse instant is a function, not only of the simultaneous value of the signal $a_n$, but also of a previous value of the signal $b_n$.

In the example, $b_n = a_n \oplus b_{n-2}$, i.e., the value of the signal $b_n$ at any instant is a EXCLUSIVE-OR sum of the simultaneous value of the signal $a_n$ and the value of the signal $b_n$ two time periods earlier. This precoding does not affect the spectrum of the base band signal, but gives great advantages in detection on the receiver side, as will be explained below.

Figure 2:
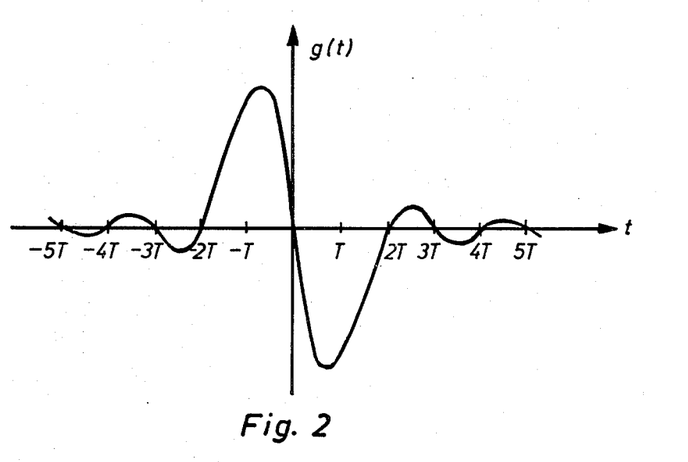
FIG. 2 illustrates a so-called Partial-Response pulse.

The signal $b_n$ is supplied to a pulse shaper 3 which, according to the Partial Response concept, transmits a Partial-Response pulse for each "one" in the signal $b_n$. The appearance of the Partial-Response pulse is apparent from FIG. 2, where it will be noted that an individual such pulse g(t) has a duration extending over several periods T in the data signal $a_n$. The signal's g(t) time function can be written:

$$g(t) = \frac{2}{\pi} \frac{\sin \frac{\pi}{T} t}{\left(\frac{t}{T}\right)^2 - 1},$$

where $1/T$ denotes the data speed.

The pulse shaper 3 output signal $f(t)$, which is the base band signal of the transmitter side, thus consists of the sum of a number of such pulses $g(t)$ shifted $nT$ in relation to each other, where $n = 1, 2, \ldots$. The signal $f(t)$ can thus be written as a sum:

$$f(t) = \Sigma b_n g(t-nT) \quad n = 0, \pm 1, \pm 2, \ldots$$

where $b_n$ is equal to zero or one, as above.

In an SSB-modulator 4, the signal $f(t)$ is made to modulate a carrier wave with the frequency $\omega_c/2\pi$, from a carrier wave source 5, this frequency being equal to 100 kHz in the example, the lower side band $S(t)$ being utilized. The signal $S(t)$ can thus be written:

$$S(t) = \frac{1}{2}[f(t) \cos \omega_c t + \hat{f}(t) \sin \omega_c t]$$

where $\hat{f}(t)$ is the Hilbert-transform of the base band signal $$\hat{f}(t) = \Sigma b_n \hat{g}(t-nT), \quad n = 0, \pm 1, \pm 2, \ldots$$

and $$g(t) = -\frac{2}{\pi} \frac{1 + \cos \pi \frac{t}{T}}{\left(\frac{t}{T}\right)^2 - 1}$$

Before the lower side band signal $S(t)$ is transmitted to the receiver side on line 7, in accordance with the above, a signal $\cos \omega_c t$ with an arbitrarily fixed phase position is added from a pilot signal source 6.

The receiver side function and construction is also schematically illustrated in FIG. 1. A demodulator 8 demodulates the transmitted signal with the help of the pilot signal having an angular frequency $\omega_c$, being applied on the transmitter side and being filtered out on the receiver side. The base band signal is applied to a data detector 9, sending a signal $a_n'$ on its output, this signal thus being as similar to the signal $a_n$, on the transmitter side, to as great a degree as is possible. The signal $a_n'$ is applied to a data sink 10.

Figure 3:
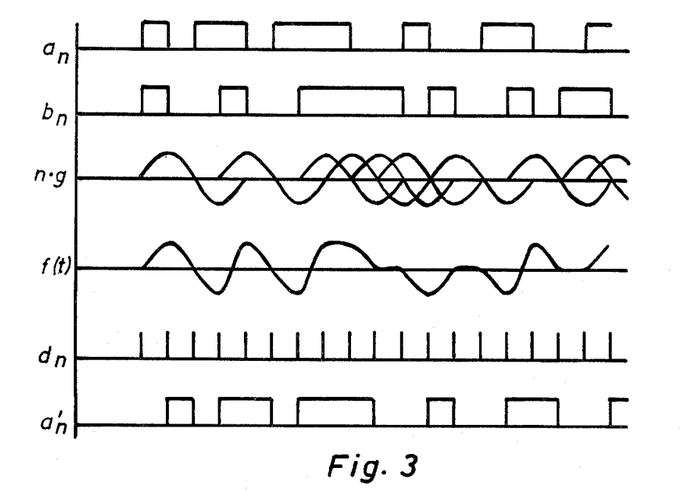
FIG. 3 illustrates associated values of some signals in the system.

Associated values of some signals in the system are illustrated in FIG. 3. As previously mentioned, the signal $a_n$ is the information-carrying signal which it is desired to transfer, and the signal $b_n$ is the signal on the precoder output. To illustrate how the base band signal $f(t)$ is formed on the transmitter side, a simplified Partial-Response pulse for each "one" in the signal $b_n$ has been shown in the signal n·g. If these pulses with their respective time shifts are added, the previously mentioned three-level signal $f(t)$ is obtained.

Providing that demodulation takes place correctly with respect to frequency and phase on the receiver side, the base band signal $f(t)$ should be recovered. The signal $d_n$ in FIG. 3 is intended to illustrate a sampling signal, the frequency and phase of which are recovered in the receiver with the aid of information in the transmitted base band signal. If the recovered base band signal $f(t)$ is sampled with the signal $d_n$ in a data detector and if a zero is interpreted as a zero, and both plus and minus one as a "one", a signal $a_n'$ is obtained which, in the illustrated example according to the figure, is a phase-shifted version of the information-carrying signal $a_n$ on the transmitter side.

From FIG. 3 it is also clear how both a frequency deviation and a phase deviation from correct values for the signal $d_n$ would give another appearance to the signal $a_n'$ and thereby introduce data errors in the transmission.

Furthermore, if the demodulation of the transmitted signal $S(t)$ in the receiver is done with a phase error $\phi$, it can be shown that after filtering, the recovered base band $r(t,\phi)$ can be written using the previously used denotations:

$$r(t,\phi) = f(t) \cdot \cos \phi + \hat{f}(t) \sin \phi$$

From this mathematical method of writing, it is quite clear that the demodulation must be coherent, i.e. the demodulation carrier wave must be phase-synchronized ($\phi = 0$) with the modulation carrier wave, if an undistorted base band signal $f(t)$ is to be recovered. Incoherent demodulation will naturally have consequences with respect to the appearance of the detected data signal $a_n'$, and will also introduce data errors in the transmission.

However, as one could perhaps deduce after a comparatively superficial analysis of the problem, there must be a relationship between the sampling phase $\delta$, and the demodulation phase error $\phi$, which gives optimum detection, i.e. a recovered data signal $a_n'$ with the lowest error frequency. An article in IEEE TRANSACTIONS ON COMMUNICATIONS, FEBRUARY 1975 pp. 259–265. "THE EFFECTS OF EQUALIZATION, TIMING AND CARRIER PHASE ON EYE PATTERNS OF CLASS-4 PARTIAL-RESPONSE DATA SIGNALS" it has been demonstrated that such a relationship exists for associated values of the variables $\phi$ and $\delta$ within certain specified limits. A phase plane can be defined by the variables $\phi$ and $\delta$ along the axes in a right-angular (orthogonal) coordinate system. The values of the variables $\phi$ and $\delta$ for which a relationship in accordance with the above can be derived forms a region $\theta 1$ in the phase plane. The rest of the phase plane can be denoted $\theta 2$. In the reference cited above, the relationship for the region $\theta 1$ has been deduced to be:

$$\delta_{OPT} = 2\phi/\pi$$

where $\delta$ is the sampling phase and $\phi$ is the demodulation phase error.

Providing that with respect to phase the region $\theta 1$ is arrived at in the synchronization process, it is thus a question of converging towards the state $\phi = \delta = 0$ while considering the relationship just mentioned. If one were to come into the region $\theta 2$ during the initial stage, the state must first be transferred to the region $\theta 1$ in a suitable way before the method according to the above can be applied.

Figure 6:
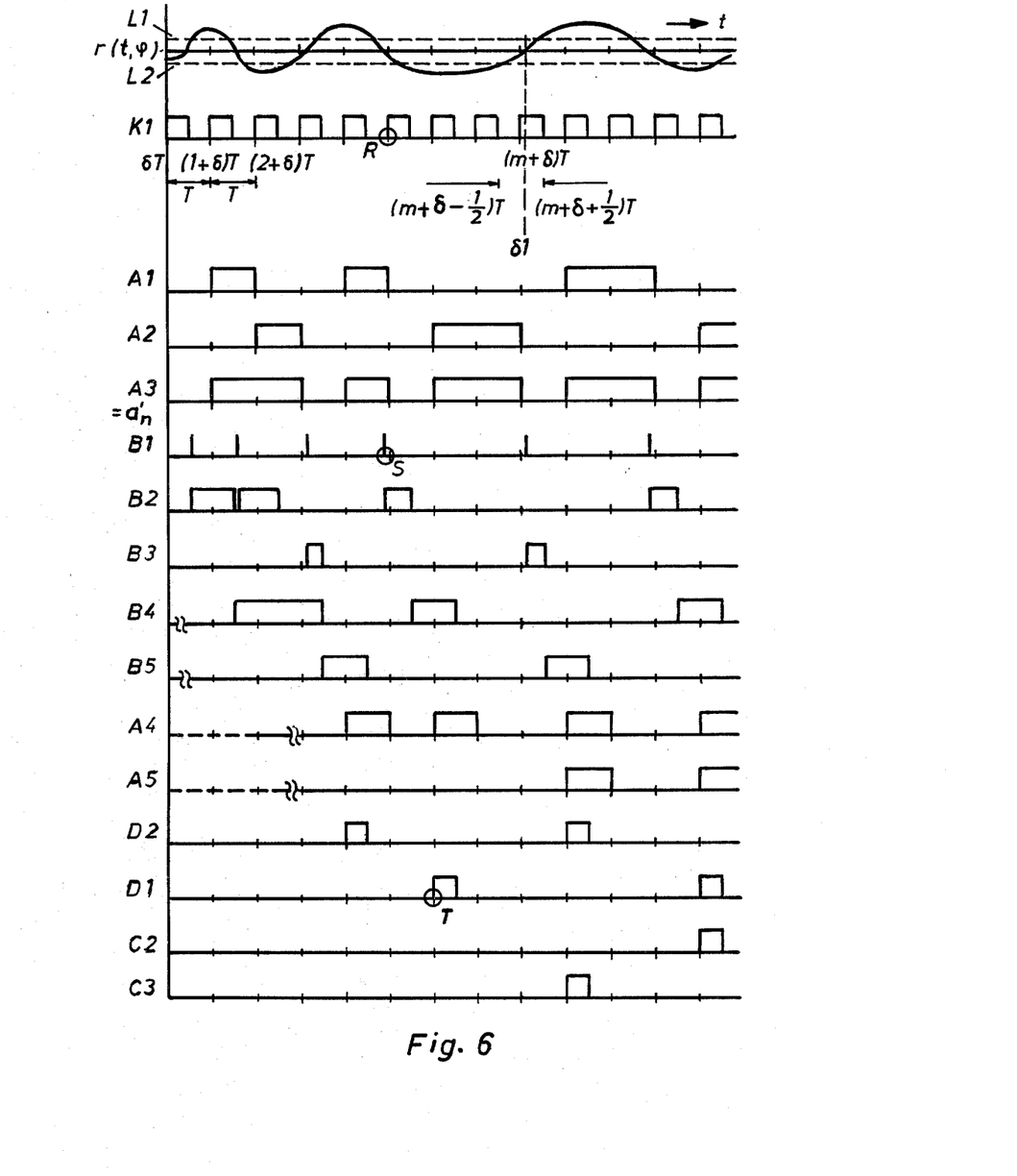
FIG. 6 illustrates associated values of some signals on the receiver side of the system.

The base band signal $r(t,\phi)$ demodulated on the receiver side is illustrated in FIG. 6, together with the sampling signal K1 for the subsequent detection. The sampling instances are determined by the positive flank in the signal K1, which has the period T and phase $\delta$. The phase state $\phi$, $\delta$ of the receiver is assumed to be in the region $\theta 1$ according to the above. The phase position for a zero crossover in the signal $r(t,\phi)$ in the time interval $(m+\delta-\frac{1}{2})$ $T<t<(m+\delta+\frac{1}{2})$ T between two "one" values has been denoted by $\delta 1$. It can then be shown that if $a_{m-1}'\cdot\overline{a_m'}$, $a_{m+1}'=1$ for error-free detection, then $\delta 1$ will come into the phase interval:

$$\phi/\pi<\delta 1<4\phi/\pi$$

It can further be shown that the statistic distribution of $\delta 1$ with a random data sequence is such that the probability:

$$\text{Prob}\{\delta 1<2\phi/\pi\}=\text{Prob}\{\delta 1>2\phi/\pi\}=\tfrac{1}{2}$$

using customary mathematical notations. The value $$\delta 1=\delta_M=2\phi/\pi \quad \text{thus forms the median.}$$

However, the optimum detection phase position $\delta_{OPT}$ for a given value of the phase error $\phi$ in the region $\theta 1$, in accordance with the above, has also been able to be deduced to precisely the value $2\phi/\pi$. If zero crossovers are thus sorted out in accordance with the above, i.e. between two "ones" in the signal recovered from the demodulated base band signal, and the sampling instants are regulated to the time for these sorted-out zero crossovers, then for statistical reasons one automatically comes into the optimum sampling position:

$$\delta_{OPT}=\delta_M=2\phi/\pi$$

Two control signals D1, D2, usable for the synchronization, i.e. convergence of the receiver to the phase state $\phi=\delta=0$, are now formed in the (m+1):th bit interval in accordance with:

$$D1=1 \text{ if } a_{m-1}'\cdot\overline{a_m'}\cdot a_{m+1}'=1 \text{ and } \delta 1<\delta$$

$$D1=0 \text{ for the remainder}$$

$$D2=1 \text{ if } a_{m-1}'\cdot\overline{a_m'}\cdot a_{m+1}'=1 \text{ and } \delta 1>\delta$$

$$D2=0 \text{ for the remainder}$$

where $\delta$ is the sensing instant of the detector, i.e. the bit rate phase position, and $\delta 1$ is, as previously, the phase position for the sorted-out zero crossover in the signal $r(t, \phi)$.

A "one" in the signal D1 is now caused to decrease the phase position $\delta$ for the sampling signal K1 by an increment of $\Delta\delta$, while a "one" in the signal D2 is caused to increase the corresponding phase position equally as much. A position of equilibrium is achieved when an average of just as many ones occur in both signals D1 and D2 per time unit, the phase of the sampling signal K1 then obtaining a value $\delta=2\phi/\pi$, which in accordance with the above permits optimum detection for a given value of the phase error $\phi$.

In order to reduce the phase error $\phi$ to the vicinity of $\phi=0$, the sampling phase $\delta$ also approaching zero in accordance with the above, two further control signals C2 and C3 can be formed while utilizing zero crossovers for which:

$$a_{m-2}'\cdot a_{m-1}'\cdot\overline{a_m'}\cdot a_{m+1}'=1$$

i.e. zero crossovers for the signal sequence 1 1 0 1 in the signal $a_n'$. If the condition is added that the signal $r(t, \phi)$ must not have changed sign in the time interval between the detection which has given the values $a_{m-2}'$ and $a_{m-1}'$, a condition which we here denote by: Sign $(a_{m-2}')=$Sign $(a_{m-1}')$, it can be shown that for the zero crossover for the phase $\delta 1$ the following applies:

$$2\phi/\pi<\delta 1<4\phi/\pi \text{ for } \phi>0 \text{ and}$$

$$4\phi/\pi<\delta 1<2\phi/\pi \text{ for } \phi<0$$

The signals C2 and C3 are now formed in the (m+1):th bit interval in accordance with:

$$C2=1 \text{ if } a_{m-2}'\cdot a_{m-1}'\cdot\overline{a_m'}\cdot a_{m+1}'=1 \text{ and } \delta 1<\delta$$

and Sign $(a_{m-2}')=$Sign $(a_{m-1}')$ $$C2=0 \text{ for the remainder}$$

$$C3=1 \text{ if } a_{m-2}'\cdot a_{m-1}'\cdot\overline{a_m'} a_{m+1}'=1 \text{ and } \delta 1>\delta$$

and Sign $(a_{m-2}')=$Sign $(a_{m-1}')$ $$C3=0 \text{ for the remainder}$$

with the same notations as previously.

A "one" in the signal C2 is caused to increase the phase $\phi$ by an increment $\Delta\phi$, while a "one" in the signal C3 is caused to decrease the phase just as much. A state of equilibrium is thus obtained when the phases $\phi$ and $\delta$ are both substantially equal to zero, optimum demodulation as well as optimum detection thus having been obtained, i.e. the receiver has been synchronized.

If, at the beginning of the synchronization sequence the receiver phase state $(\phi, \delta)$ is in the previously mentioned region $\theta 2$, the aim is thus to discover this and also rapidly to put the receiver in a phase state in the region $\theta 1$, where the converging method just described can be utilized.

In the region $\theta 2$ there is, as previously mentioned, no stable locking position and no converging algorithm for locking. This results in that the probability of contravening the inherent code restriction of the Partial-Response signal increases heavily, and this situation can thus be used as an indication that the phase state is in the region $\theta 2$. To detect such contraventions of the code restriction, the sampling values of the demodulated signal $r(t, \phi)$ are compared with two levels symmetrically situated about a zero level and when the binary signals A1 and A2 are formed. If the signal $r(t, \phi)$ is greater at the sensing instant than the positive level, the signal A1 is equal to one, otherwise it is equal to zero in the following bit interval. In a corresponding way, the signal A2 is equal to one when the signal $r(t, \phi)$ is less than the true negative level at the sensing instant, otherwise it is equal to zero in the subsequent bit interval.

Starting from these signals A1 and A2, a control signal D3 can be formed in the m:th time interval such that:

$$(D3)_m=(A1)_m\cdot(D4)_{m-2}+(A2)_m\cdot\overline{(D4)}_{m-2}$$

where the binary auxiliary signal D4 is formed according to:

$$(D4)_m=(A1)_m+\overline{(A2)_m}\cdot(D4)_{m-2}$$

By the denotations $(A1)_m$, $(A2)_m$ etc. is intended the value of the binary signal A1, A2 etc. in the m:th time interval $(m+\delta)T < t < (m+1+\delta)T$ with previously used notations.

According to the above, the control signal D3 will be equal to "one" in the detecting interval if a contravention of the partial response restriction has occurred, and otherwise it will be zero. The control signal can thus be used to correct the phase state $\phi$ of the recovered demodulating carrier wave as well as for correcting the bit rate phase state $\delta$.

If correction takes place with the same sign the whole time, e.g. the phase state is increased all the time, and if the phase control of the carrier wave is furthermore made quicker than that of the bit rate, then different phase combinations $\phi$, $\delta$, will be rapidly examined until the error pulses in the signal D3 cease, which indicates that the phase state ($\phi$, $\delta$) has arrived in the region $\theta 1$, which was the intention. As explained above, there is a converging algorithm in this region, and the system is thus locked onto the phase state $\phi$ equal to $\delta$ equal to zero.

Figure 4:
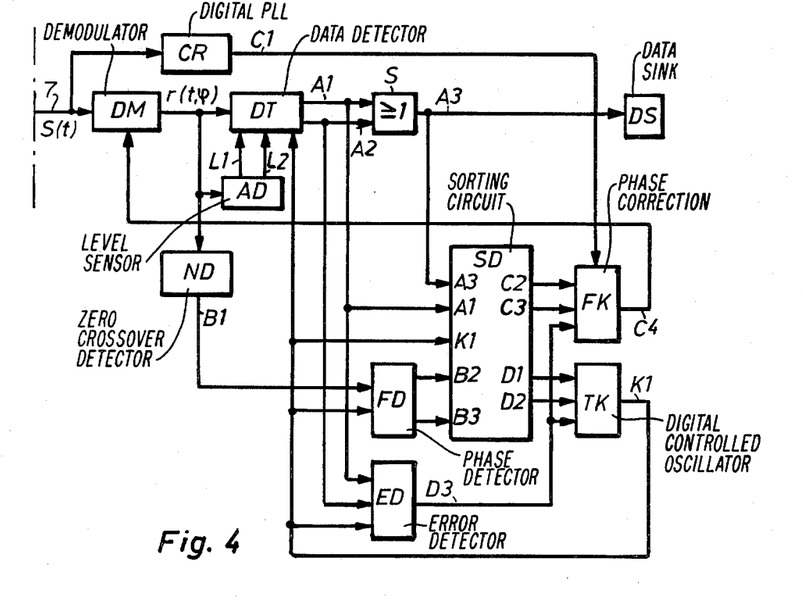
FIG. 4 illustrates a receiver in which the inventive principle is utilized.

FIG. 4 shows, as mentioned, a receiver in which the inventive principle is used. The units 8, 9 and 10 in accordance with FIG. 1 can be identified in FIG. 4 as the demodulator DM, data detector DT and the data sink DS respectively. The remaining units in FIG. 4 coact in accordance with the inventive concept for control into the correct demodulation phase ($\phi=0$) simultaneously as the base band signal r(t, $\phi$) is sampled in the optimum phase $\delta_{OPT}$ the whole time.

The transmitted side band S(t) with the added pilot signal having the frequency 100 kHz comes from line 7 and is applied to the input of the demodulator DM. The same signal is applied to a digital phase-locked loop CR, which locks onto the pilot frequency and on its output sends a binary signal C1 with the frequency 100 kHz and an arbitrarily fixed phase position. In turn, the signal C1 is applied to the input of a phase correction circuit FK which, in response to the signals on three control inputs via its output connected to the carrier wave input on the demodulator DM, sends a carrier signal C4 with a phase position which is optimum after the setting sequence of the apparatus.

On its output, the demodulator thus sends the base band signal r(t, $\phi$) according to the above, which at every instant is thus a function of the phase deviation $\phi$ of the demodulation carrier from optimum value.

The base band signal is subsequently decoded in a data detector DT connected to the demodulator output, with the intention of recovering the original data signal $a_n$ sent from the transmitter side. The characteristics of the base band signal have been shown above to be so decoding per se could be arranged such that the base band signal was first rectified and thereafter sampled and compared with a fixed level. For special reasons, which will be understood from what has been said above, a data detector in which the base band signal is not first rectified is used in the example shown. This results in that the sampling values must be compared with two levels L1 and L2, symmetrically situated about the zero level. These detection levels are obtained, as known to the art, from the signal energy or signal amplitude in the base band signal r(t, $\phi$), which is connected to the input on a level sensing circuit AD. This circuit has two outputs connected to the detector, one for each level L1 and L2.

The sampling signal K1 necessary for detection is formed on the receiver side while utilizing bit rate information in the transmitted base band signal. Such bit rate information is to be found, inter alia, in the zero crossovers of the base band signal, which are therefore detected in a zero crossover detector ND, sending a short pulse on its output each time the base band signal r(t, $\phi$) changes polarity.

If we assume for a moment that the sampling signal K1 has been recovered with the appearance shown in FIG. 6 and the base band signal r(t, $\phi$) is sampled in the data detector DT according to the same figure, and if we furthermore compare the sampled value with the levels L1 and L2 plotted onto the base band signal, the signals A1 and A2 will be obtained on the detector output. The sampling instant is thereby determined by a positive flank of the sampling signal or the so-called bit rate K1. If the signal r(t, $\phi$) is greater than the level L1 in the sampling instant, the signal A1 is equal to "one", otherwise it is equal to zero, in the following bit interval. In a corresponding way, the signal A2 is equal to "one" when the signal r(t, $\phi$) is less than the level L2 in the sampling instant, otherwise it is equal to zero in the following bit interval, as has been previously described. If both these signals A1 and A2 are then summed in an OR circuit S the detected data signal A3 is obtained, in accordance with FIG. 6, and in a disturbance-free transmission system, it would constitute a delayed version of the transmitted signal $a_n$, and has been previously given the denotation $a_n'$. The signal A3 equal to $a_n'$ is connected to the data sink DS in FIG. 4.

Now, as has already been shown, zero crossovers of certain categories are especially interesting when it is a question of forming control signals to the phase correction circuit FK as above and to a digital controlled oscillator TK for the sampling signal K1. There is a sorting circuit SD for sorting out the zero crossovers which are of interest. This circuit has a plurality of inputs and outputs and is shown in greater detail in FIG. 5.

The output signal B1 from the zero crossover detector ND, also shown in FIG. 6, is taken to one input of a phase detector FD, while the bit rate K1 at its instantaneous phase is applied to the other input of the detector. The detector FD sends out two binary output signals B2 and B3. When a detected polarity change in the base band signal r(t, $\phi$) occurs in a time interval when the bit rate signal K1 is equal to one, i.e. with previously used denotations when the phase $\delta 1$ is greater than the phase $\delta$, the output signal B3 will be equal to one. In a corresponding way, the output signal B2 will be equal to one if a pulse in the signal B1 occurs when the signal K1 is equal to zero, i.e. when the phase $\delta 1$ is less than the phase $\delta$. Both output signals B2 and B3 are zeroed by negative flanks in the signal K1, i.e. at the instants $t=(m+\delta+\frac{1}{2})T$.

Figure 5:
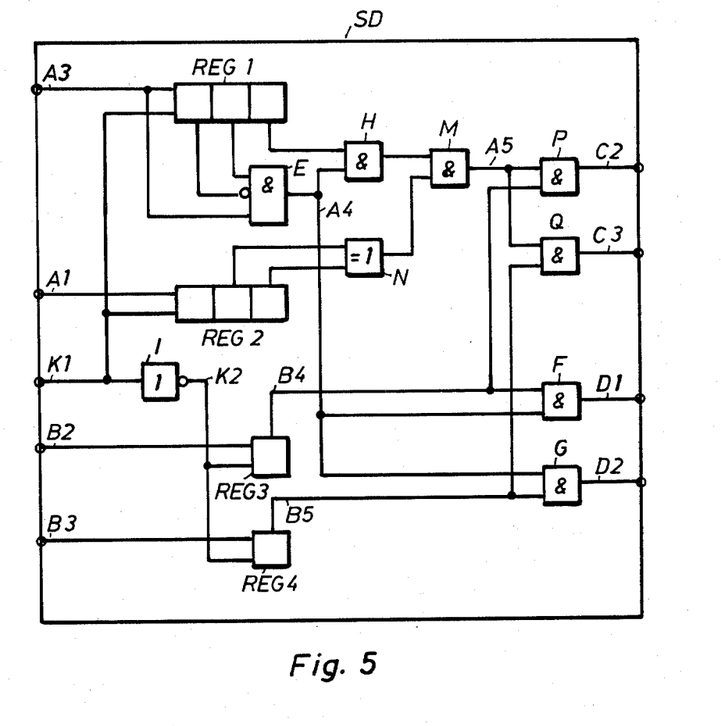
FIG. 5 illustrates a sorting circuit included in the receiver according to FIG. 4

In the sorting circuit SD, the signals B2 and B3 are connected to a clocked one-bit register REG 3 and REG 4, respectively. These registers are clocked by negative flanks in the bit rate signal K1, which is connected to the clock inputs of the registers via an inverter I in the sorting circuit.

According to FIG. 5, the detected data signal A3 equal to $a_n'$ is connected to the sorting circuit SD such that it is fed into a three-bit shift register REG 1. The two first bits of this register, thus containing the two latest clocked-in signal values and the instantaneous value of the signal A3, are put together in an AND-circuit E so that the latter gives a one in its output signal A4 when the bit sequence one-zero-one is detected, i.e.

$$(A4)_m = (A3)_{m-2} \cdot \overline{(A3)_{m-1}} \cdot (A3)_m$$

As explained above, this is precisely such a zero crossover which it was desired to sort out.

The output signal B4 from the register REG 3 is put together with the signal A4 in an AND-circuit F with the output signal D1. When thus a negative flank in the bit rate signal K1 clocks in the signal B2 equal to "one" in the register REG 3, and thereby makes the output signal B4 equal to "one", this means that a zero crossover in the base band signal r(t, φ) has been detected during the second half period of the previous bit interval.

This zero crossover is obviously the same as has given rise to the registered zero bit in the first bit position of the register REG 1.

When the signals B4 and A4, in accordance with the above, are equal to "one", the output signal D1 from the AND-circuit F will consequently be equal to "one". With the conditions given above, the current positive bit rate flank thus lags the detected zero crossover in phase (e.g. compare the markings R, S, T in FIG. 6). Furthermore, the phase difference is less than 180°, and therefore an adjustment of the bit rate phase to the zero crossover, with the least alteration in the bit frequency is provided by an increase of the instantaneous frequency of the signal K1. The signal D1 constitutes one of the output signals from the sorting circuit SD and is connected to one of the control inputs on said digital controlled oscillator TK. A one in the signal D1 thereby increases the frequency of the oscillator, which has its output connected, inter alia, to the sampling input of the detector DT and thereby reduces the phase difference between a positive flank in the sampling signal and a detected zero crossover when the latter is of the sorted-out category mentioned above.

In a corresponding mode, a negative flank in the signal K1 can clock in the signal B3 equal to one in the register REG 4, its output signal B5 then being equal to "one". When this happens, it signifies that during the previous half period in the bit rate signal K1 a zero crossover in the signal r(t, φ) has been detected, but this time with a phase position relative the positive flank in the signal K1 such that the most rapid adjustment is provided by a decrease of the instantaneous frequency of the signal K1. In the same way as before, the signals A4 and B5 are therefore put together in an AND-circuit G with an output signal D2 which, in a corresponding way as the signal D1, is thus allowed to actuate the oscillator TK, but in this case on a control input where a "one" provides a decrease in the instantaneous frequency of the output signal K1. As far as the system above is described, it obviously achieves the desired adjustment of the sampling phase towards an optimum position with the assumed demodulation phase error φ. The phase state (φ, δ) must naturally also be assumed to lie in the previously mentioned region θ1.

According to the described method, the regulation of the demodulation phase must base itself on sorted-out zero crossovers for the sign sequence 1101 in the signal $a_n'$. Thus, if the register REG 1, according to FIG. 5, contains the bits 110, stated in the order they have been registered, and the next bit in the signal A3 is a "one", then as previously, the signal A4 will be equal to a "one" but also the output signal from the AND-circuit H, which has applied to its two inputs the signal A4 and the output from the first bit position of the register REG 1.

According to the method, a further criterion was to be placed on the sorted-out zero crossover, namely that the signal r(t, φ) would not get a changed sign in the time interval between the two detections, which had given the two first registered values (two "ones") in the register REG 1. That this criterion has been met can be tested with the aid of one of the two signals A1 and A2 on the output from the detector DT. In the example shown, the signal A1 has been selected, which has similarly been shifted into a three-bit shift register REG 2. An EXCLUSIVE-OR circuit N with an inverted output senses the two first bits in the register REG 2 and thus gives a "one" on its output when said criterion is met. An auxiliary signal A5 is now formed with an AND-circuit M, the two inputs of which are connected to the outputs on the circuits H and N. It is thus obvious that:

$$(A5)_{m+1} = (A4)_{m+1} \cdot (A3)_{m-2} \cdot \overline{[(A1)_{m-2} \oplus (A1)_{m-1}]}$$

Information on the occurrence of the thus sorted-out zero crossover in relation to the current sampling signal phase is obtained as previously from the signals B4 and B5, and with the help of two further AND-circuits P and Q, two control signals C2 and C3 can now be formed according to:

C2 = A5·B4 and

C3 = A5·B5

The signals C2 and C3 are connected to two of the control inputs on the phase correction circuit FK and provide, as previously mentioned, a positive or negative adjustment of the phase for the demodulation carrier C4 for a "one" in the respective signal, and a state of equilibrium is obtained according to the above.

An apparatus according to the above thus solves the stated problem with the phase synchronization and has the advantages as stated, always providing that the phase state (φ, δ) at the beginning of the synchronization is in the above defined region θ1.

If this is not the case, the method described above provides a solution for this problem as well. The locking-in region is hereby expanded to comprise all phase states (φ, δ).

In the receiver according to FIG. 4, an error detector ED is arranged to receive the signals A1, A2 and K1 on its three inputs. The output signal D3, formed from these signals as described above, thus indicates with a "one" that contravention against the inherent code restriction of the Partial-Response signal has been detected. The signal is applied to the third input on the respective circuit TK and FK to force the signal changes described above, the phase state rapidly being transferred to the region θ1.

What we claim is:

1. In a synchronous data transmission system having a transmitter which emits a single side band carrier of a first frequency amplitude-modulated by a signal derived from a binary pulse train of pulses of the Partial Response Class 4 type coding whereby a binary pulse train of a second frequency is transmitted and a receiver which demodulates the signal transmitted thereto to a base band signal with the aid of a first signal having the first frequency and detecting the binary signals therefrom with the aid of a clock signal of the second frequency derived from the base band signal, a method phase synchronizing the receiver to the transmitter comprising the steps of:

(a) detecting, in the base band signal, a given multibit binary sequence;

(b) zero-crossing detecting the base band signal at the receiver; and (c) phase comprising each generated zero-crossing signal with the clock signal derived from the base band signal to increase the frequency of the clock signal when the zero crossing signal leads the clock signal in phase and to decrease the frequency of the clock signal when the zero crossing signal lags the clock signal only when there is detected the given multibit binary sequence.

2. The method of claim 1 wherein the base band signals represent a first binary value by a signal greater than a given amplitude of either polarity and represents a second binary value by the signal having less than a given amplitude further comprising the steps of detecting for the presence of the binary sequence 1101 in the base band signal with the adjacent 11 values of the sequence being derived from base band signals having signal amplitudes of the same polarity for changing the frequency of the first signal, the direction of change being in accordance with whether the zero crossing signal leads or lags the clock signal.

3. The method of claim 1 or 2 further comprising the step of sampling the base band signal to determine if such signal contravenes a property of the Partial-Response coding for simultaneously changing the frequency of the first signal and the clock signal.

4. In a synchronous data transmission system having a transmitter which transmits a Partial Response Class 4, a single-side band amplitude-modulated carrier signal, and a receiver having a demodulator including means for receiving the amplitude-modulated carrier signal and the carrier signal per se, and a data detector having a data input connected to the demodulator and a clock signal input for controlling the times said data detector samples the output of the demodulator, signal regenerating means comprising a digital phase-locked loop type clock signal regenerating apparatus comprising a digitally-controlled oscillator with first and second control inputs for respectively increasing and decreasing the oscillating frequency and an output, a zero crossing detector means for emitting a signal each time the signal from the demodulator passes through zero amplitude, phase comparator means having first and second inputs and first and second outputs, one of said outputs emitting a signal when the phase of the signal on one input leads the phase of the signal on the other input, the other of said outputs emitting a signal when the phase of the signal on said one input lags in phase the signal on the other input, means for connecting one of the inputs of said phase comparator means to the output of said zero crossing detector means, means for connecting the other input of said phase comparator means to the output of said digitally controlled oscillator, and coded combination detecting means connected to the data detector for operatively connecting the outputs of said phase comparator means to the control inputs respectively of said digitally controlled oscillator when a particular serially coded combination of binary signals is emitted by the data detector.

5. The signal regenerating apparatus of claim 4 further comprising a carrier signal regenerating means, carrier phase correction means having first and second control inputs and an output connected to the demodulator for changing the phase of the carrier signal received by the demodulator in opposite directions in accordance with which control input receives a signal, further coded combination detecting means connected to the data detector for operatively connecting the outputs of said phase comparator means to the control inputs, respectively, of said phase correction means when another particular serially coded combination of binary signals is emitted by the data detector.

6. The signal regenerating apparatus of claim 4 wherein the signals from the demodulator have given properties in accordance with Partial Response Class 4 rules further comprising error detector means sampling the signals from the demodulator for giving an error signal when a given property is absent.

7. The signal regenerating apparatus of claim 6 wherein digitally controlled oscillator has a further control input receiving the error signal for changing the oscillating frequency.

8. The signal apparatus of claim 6 or 7 wherein said carrier phase correction means has a further control input receiving the error signal for causing the carrier phase correction means to change the phase of the carrier signal in a given direction.

* * * * *